April 7, 1953 W. W. PAGET 2,633,717
RECTIFICATION COLUMN
Filed Sept. 29, 1949 4 Sheets-Sheet 1
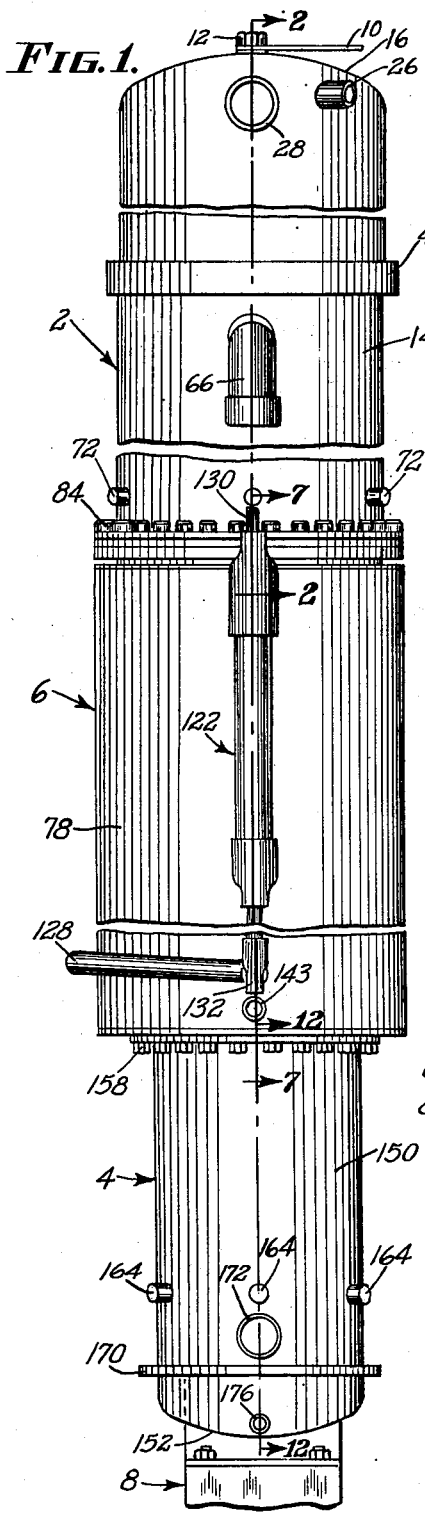
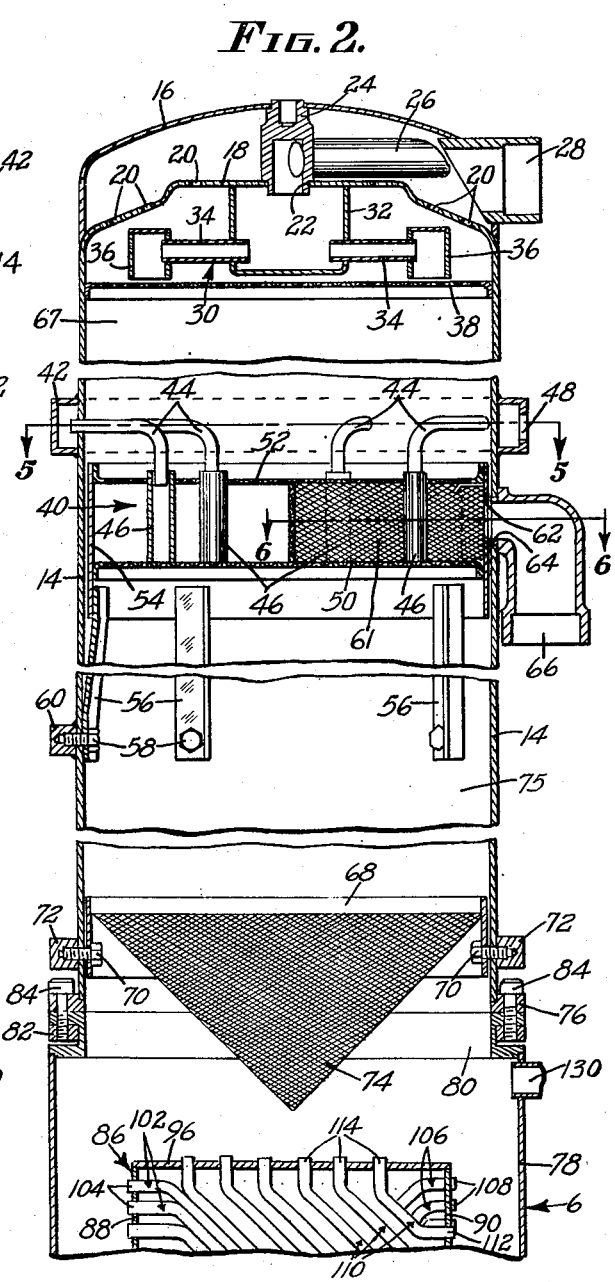
INVENTOR.
Win W. Paget
By John F. Schmidt
ATTORNEY.

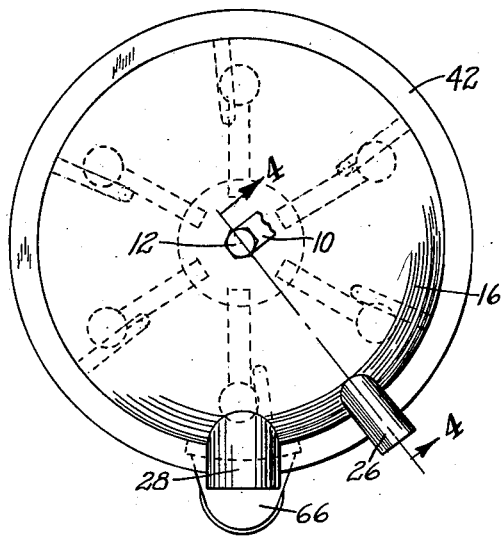
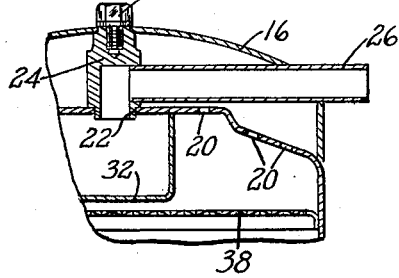
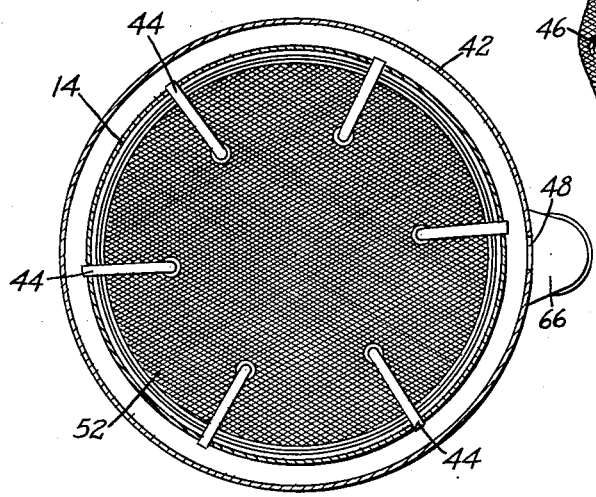
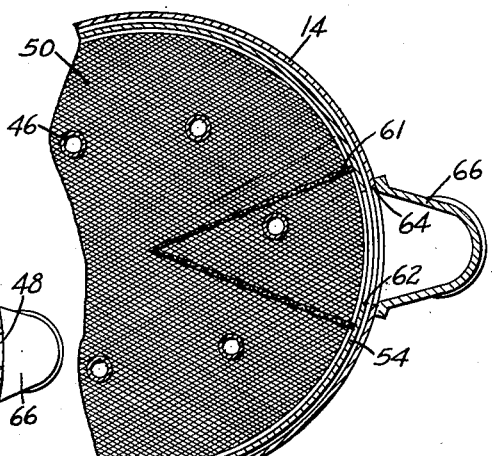

April 7, 1953 W. W. PAGET 2,633,717
RECTIFICATION COLUMN
Filed Sept. 29, 1949 4 Sheets-Sheet 3
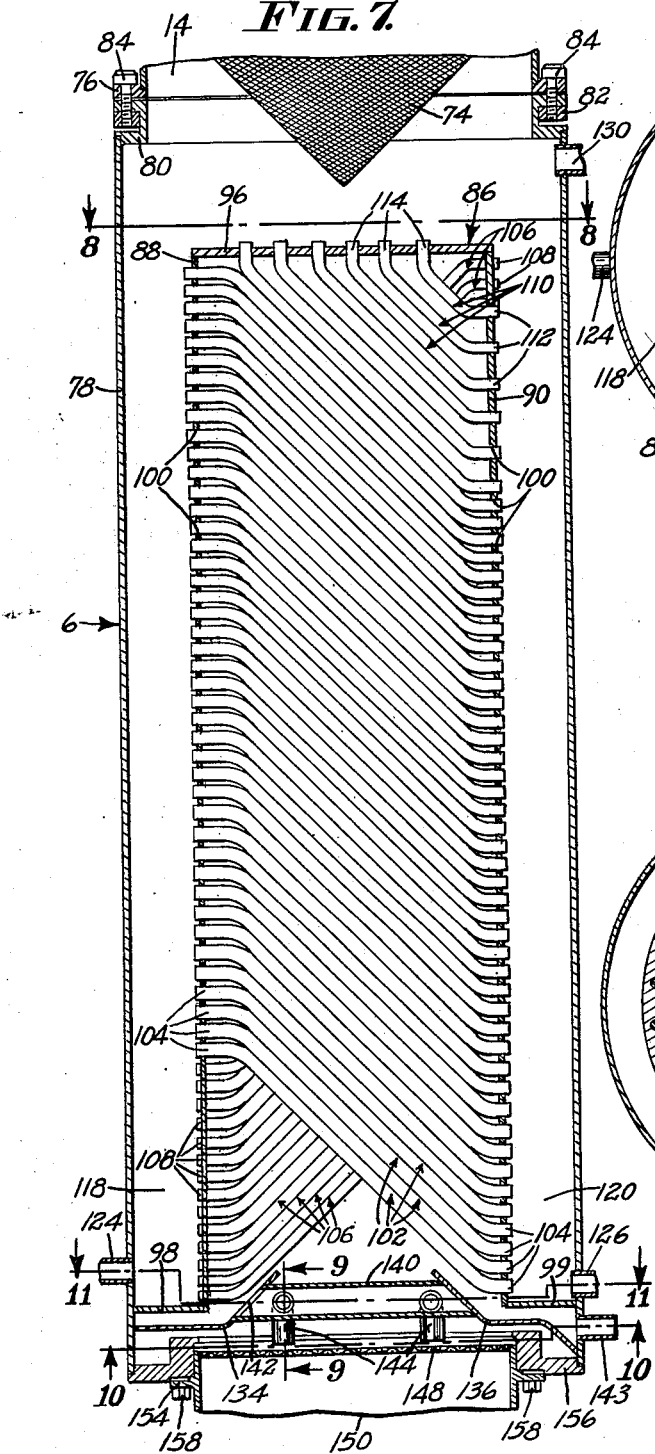
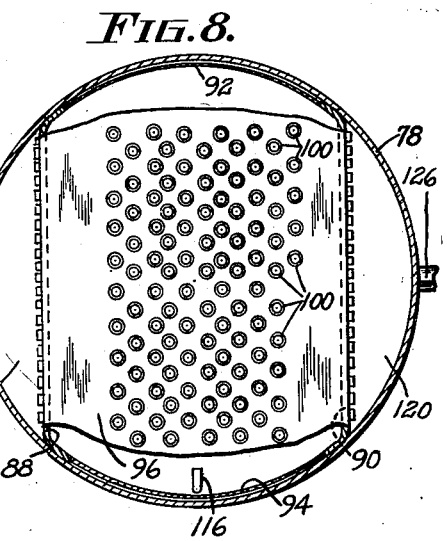
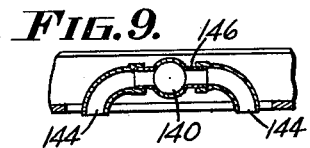
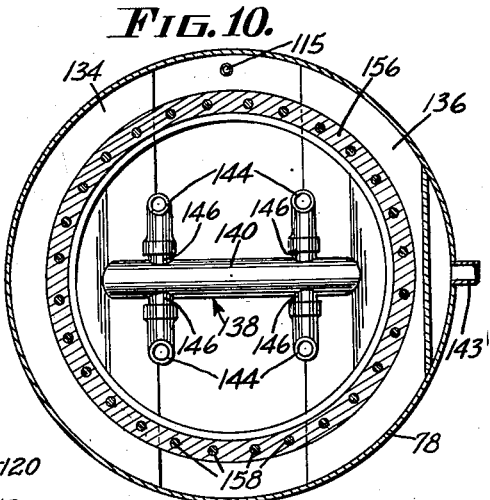
INVENTOR.
Win W. Paget
By John F. Schmidt
ATTORNEY.

April 7, 1953 W. W. PAGET 2,633,717
RECTIFICATION COLUMN
Filed Sept. 29, 1949 4 Sheets-Sheet 4

INVENTOR.
Win W. Paget
By John F. Schmidt
ATTORNEY.

Patented Apr. 7, 1953

2,633,717

UNITED STATES PATENT OFFICE 2,633,717

RECTIFICATION COLUMN

Win W. Paget, Michigan City, Ind., assignor to Joy Manufacturing Company, Pittsburgh, Pa., a corporation of Pennsylvania Application September 29, 1949, Serial No. 118,615

12 Claims. (Cl. 62—122)

This invention relates to a rectification column, especially to a so-called "double-column," such as might be used in a system like the one shown in Fig. 2 of copending application of Samuel C. Collins, Serial Number 122,077, filed October 18, 1949, and assigned to the assignee of this invention.

A critical part of the so-called "double-column" type of rectifier column is the evaporator-condenser which divides the column into the high-pressure and low-pressure sections. In the rectification of air, more particularly where the desired product is oxygen, it is in the evaporator-condenser at the middle of the column that the oxygen product is collected and where it receives its simultaneous purification by heat exchange with gases in the lower section of the column; these gases are principally nitrogen, and the final step of purification is achieved by condensation of the nitrogen in the lower section and simultaneous boiling of impurities out of the liquid oxygen product in the lower end of the upper section. For efficient operation, with a minimum of heat loss, the evaporator condenser should provide a large contact surface area in a small amount of space.

It is, accordingly, an object of this invention to provide a rectification column of the "double-column" type having a greatly improved evaporator-condenser. This and other objects are accomplished in a column of the double-column type in which an open-ended chamber is sealed at its open end to the column to divide the column into upper and lower sections. Conduits are secured in openings in the chamber walls, the preferred arrangement constituting one in which one group of conduits is arranged with the conduit ends substantially parallel and opening in a horizontal direction to the chamber exterior with the portions between the ends being inside the chamber and arranged on a slope, another group of conduits having similarly parallel ends opening horizontally to the chamber exterior with the portions between the ends being arranged to slope in the opposite direction and crossing the first-mentioned sloping portions, and with another group of conduits being arranged with the conduit ends being at right angles to each other, one end of each conduit opening horizontally and the other end opening vertically.

In the drawings:

Fig. 1 is a view in elevation of a rectification column made according to the invention.

Fig. 2 is a view in section substantially on line 2—2 of Fig. 1.

Fig. 3 is a top plan view of the column shown in Fig. 1.

Fig. 4 is a view in section substantially on line 4—4 of Fig. 3.

Fig. 5 is a view in section on line 5—5 of Fig. 2.

Fig. 6 is a view in section on line 6—6 of Fig. 2.

Fig. 7 is a view in section on line 7—7 of Fig. 1.

Fig. 8 is a view in section on line 8—8 of Fig. 7.

Fig. 9 is a view in section on line 9—9 of Fig. 7.

Fig. 10 is a view in section on line 10—10 of Fig. 7.

Figure 11:
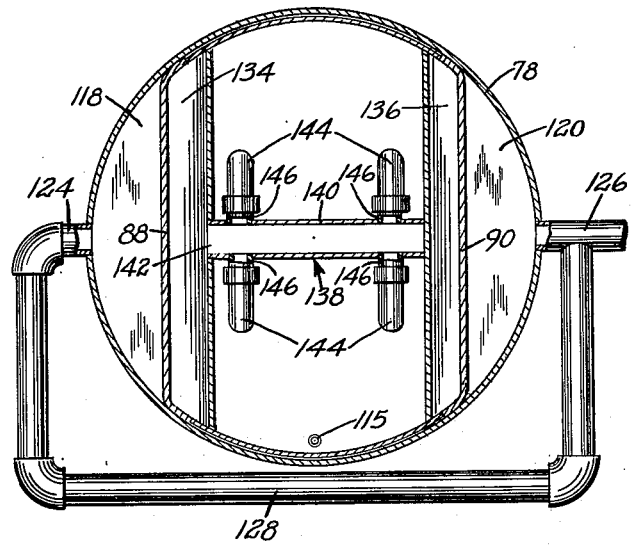
Fig. 11 is a view in section on line 11—11 of Fig. 7.
Figure 12:
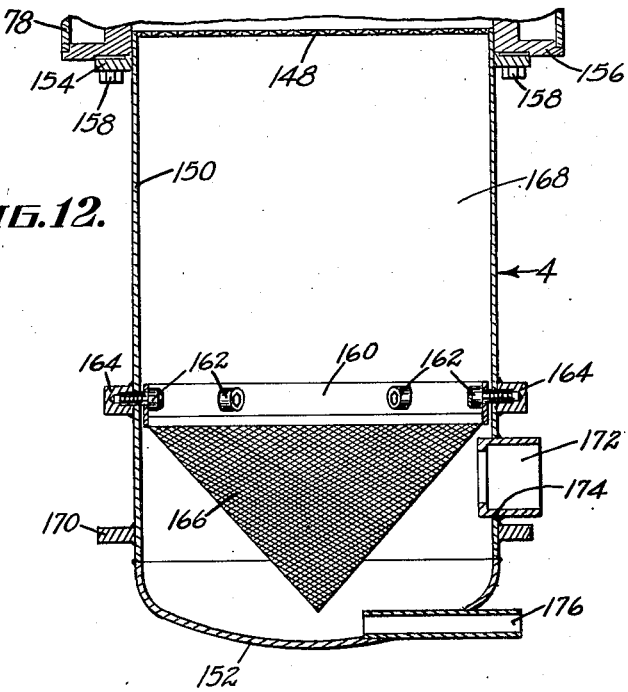
Fig. 12 is a view in section on line 12—12 of Fig. 1.

Fig. 1 shows a column of the double-column type having an upper column section 2 and a lower column section 4. The evaporator-condenser section 6 is actually the portion of the column which divides the column into upper and lower sections, these being, respectively, in the type of system disclosed in the Collins patent application referred to above, low and high-pressure sections.

The column may be mounted by means of any satisfactory mounting means indicated generally at 8 and may be braced as desired, for example by a brace 10 shown in Fig. 1 as being secured to the top of the upper column section by means of a screw 12.

The upper, or low-pressure, section of the column is best seen in detail in Figs. 2 to 7 inclusive, in which a substantially cylindrical shell 14 is provided with a cap portion 16. The portion 14 has an integral upper end wall 18, perforated as shown at 20 and provided with a centrally located opening 22 in which there is mounted an inlet connection 24 which communicates with and is secured to an inlet conduit 26. The conduit 26 projects outward through the cap 16, as is best seen in Figs. 1-4. The cap 16 is also provided with a waste gas (mostly nitrogen) outlet 28 which communicates with the interior of the upper column by way of perforations 20.

A liquid nitrogen distributor, indicated generally at 30, is provided immediately beneath the upper end wall 18 and communicates with the connection 24. The liquid distributor 30 comprises a cup 32 with a plurality of distributor conduits 34 extending radially outward therefrom, which are provided at their outer ends with nozzle members 36. The liquid distributor 30 discharges its liquid onto a fine mesh screen 38 which is disposed in the shell 14, preferably immediately below the distributor 30.

A liquid air distributor 40 is located in the shell 14 below the screen 38. The liquid air distributor 40 preferably consists of a header ring 42 secured to the outside of the shell 14, of a plurality of right-angle conduits 44 passing through openings in the shell 14 and communicating at their outer ends with the interior of the header ring 42, and of a plurality of short conduits 46 open at both ends and loosely receiving the inner, down-turned ends of the right-angle conduits 44. The header ring 42 is provided with an opening 48 which is adapted to receive a connection to the conduit for liquid air taken from the lower section of the column, as will be explained below.

The short conduits 46 rest at their lower ends on a fine mesh screen 50 and their upper ends pass through openings in another fine mesh screen 52. The screens 50 and 52 are preferably mounted in a sleeve 54 which is supported by brackets 56 secured to the shell 14 by means of bolts 58 engaging nuts, one of which is shown at 60.

A coarse mesh V-shaped screen 61 is mounted between screens 50 and 52 opposite an opening 62 in the sleeve 54 and an opening 64 in the shell 14. A connection 66 is secured in the opening 64 and serves to conduct by-pass air from the expansion engine directly into the upper section of the column, as will be well understood by those skilled in the art after reference is had to the above-identified patent application of Collins.

The space 67 between the screens 38 and 52 is packed with any of a number of porous substances adapted to break a liquid down into fine particles. Such a substance could, for example, be stainless steel wool, but a preferred packing material is 100 mesh ¼" by ¼" saddle-shaped stainless steel screens. Similarly, the space between screens 50 and 52 is filled with coarse packing, such as ½" stainless steel saddles, which are kept from falling out through connection 66 by screen 61.

At or near the lower end of shell 14 there is mounted on the inside thereof a sleeve 68 by means of bolts 70 and nuts 72 secured to the outside of the shell 14. Sleeve 68 holds a cone-shaped screen 74, the principal function of which is to hold in place a quantity of packing material such as is referred to in the preceding paragraph, the material filling the space 75 between screens 50 and 74.

The lower end of shell 14 is provided with a flange 76, by which shell 14 is secured to shell 78 of the evaporator-condenser section 6. As is best seen in Figs. 2 and 7, shell 78 is provided at its upper end with a mounting ring 80 which has a U-shaped cross section and is adapted to receive a clamping ring 82; ring 82 is preferably drilled and threaded to receive the threaded ends of assembly bolts 84.

In the shell 78 there is disposed an open-ended chamber 86. Chamber 86 is provided with side walls 88 and 90 which are substantially plane and other side walls 92 and 94 formed to be joined to side walls 88 and 90, the side walls 92 and 94 being preferably arcuate in cross section to conform to the internal curvature of shell 78. Chamber 86 is also provided with a top or upper end wall 96 secured to the side walls, but is open at its lower end, as is best seen in Fig. 7. Means to provide a fluid tight seal between the shell 78 and the chamber preferably consist of plates 98 and 99 secured to the inside of the shell 78 and the lower or open end of chamber 86.

The walls of chamber 86 are provided with a plurality of openings 100; a plurality of conduits are secured in the chamber 86 with their ends in the openings 100 in the walls thereof, both ends of each tube being open to the exterior of the chamber—i. e. open into the upper, or low-pressure, section of the column. The portions of the tubes between the ends are, of course, within the chamber 86 and are exposed to the gases rising from the lower section (the high-pressure section) of the column.

Some of the plurality of conduits, numbered 102, are disposed in the chamber 86 with their ends 104 substantially parallel and opening horizontally into the upper section of the column. The portions of the conduits 102 between the ends 104 are arranged at or on a substantial slope, preferably approximately 45° from the vertical.

A second group of the plurality of conduits, numbered 106, are secured in the chamber 86 with their ends 108 also substantially parallel and opening horizontally to the exterior of the chamber 86 (in other words, opening into the upper section of the column) in much the same manner as the conduits 102. The conduits 106 differ from the conduits 102 in that the portions thereof between the ends are arranged at a slope which is the opposite of the slope given to the mid-portions of tubes 102. In other words, as is best seen in Fig. 7, the sloping portions of the tubes 102 and 106 cross, preferably substantially at right angles to each other.

Still another of the plurality of conduits are arranged in openings in the walls of chamber 86 with their opposite ends substantially at right angles to each other. More specifically, conduits 110 are shown as having their ends 112 disposed in openings in the side wall 90 of the chamber 86 and thus opening in a horizontal direction, and with their ends 114 secured in the openings in the end wall 96—in other words, opening in a vertical direction and substantially at right angles to the ends 112. The portions between the ends of the conduits 110 are shown as having the same slope as the conduits 102. It will of course be understood by those skilled in the art that there is preferably still another plurality of conduits, not shown, similar to the conduits 110 but having one end of each conduit opening vertically into the space above the upper end wall 96, and their other ends opening horizontally into the space to the left of the side wall 88, with the portions between those ends taking a slope similar to that of conduits 106.

A neon-helium bleed line 115, the upper end of which is shown at 116 in Fig. 8, preferably leads from a point just beneath the upper end wall 96 downward and out of the chamber 86, connecting with the nitrogen or waste gas line of the system, in order to prevent an accumulation of neon and helium gases in the top of chamber 86.

It will be noted that the arrangement of conduits 102 and 106 shown in the drawings provides several advantages. One advantage is that it permits the portions of the conduits between the ends to be placed close together, in fact in actual contact if desired, while at the same time spacing the conduit ends 104 and 108 sufficiently to allow adequate spacing of the holes in the side walls 88 and 90, which in this case serve as tube sheets. Another advantage of this arrangement of the conduits 102 and 106 is that it allows condensed liquid to run along the inclined or sloping conduits toward one or the other of the collector devices, which will be explained in greater detail below.

Where a double column such as is shown and described herein is used in an air separation system to produce an oxygen product, it will be understood by those skilled in the art that the liquid which accumulates in the spaces 118 and 120 will be oxygen of a high degree of purity. This oxygen product is preferably removed from the column in the liquid form, after which it may be delivered as liquid oxygen or may be delivered as gaseous oxygen after it has given up its heat to provide refrigeration for the system. As is explained in my copending application Serial No. 118,614, filed September 29, 1949, now Patent No. 2,586,989, February 26 1952, it is desirable that the liquid oxygen product be removed from the column from a location at or near the bottom of the chamber in which the liquid collects or accumulates.

This end is accomplished by the use of a chamber device indicated generally at 122. The chamber device is connected to draw liquid oxygen from the column through the outlets 124 and 126, which withdraw liquid from the chambers 118 and 120 respectively. As is best seen in Fig. 11, outlets 124 and 126 are connected together by a suitable conduit 128. The conduit 126 communicates with the lower end of chamber device 122, and the upper end of the chamber device 122 communicates with the column by means of a conduit 130, as will be well understood by those skilled in the art after reference is had to my above-identified copending application. A connection 132 communicates with the conduit 126 and with a drain, not shown, which is suitably valved to enable liquid oxygen to be drained directly from the column if desired, or to blow down the oxygen liquid chambers 118 and 120 if that should be desired, or for any other purpose.

Reference was made above to the slope of those portions of the conduits between the ends as allowing condensed moisture to drain toward the side walls 88 and 90 of the chamber 86. The moisture which thus flows downward along the inclined conduits falls into condensate collectors located beneath the conduits. In the embodiment of the invention described herein and illustrated in the annexed drawings, the condensate collectors comprise spaced-apart troughs 134 and 136, the trough 134 being located beneath the side wall 88 and the trough 136 being arranged beneath the side wall 90. The troughs 134 and 136 will be suitably sealed to the shell 78 of the evaporator-condenser section 6.

A liquid distributor indicated generally at 138 is mounted adjacent the troughs and has a connection to receive liquid from one of them. The distributor includes a conduit 140 which spans the space between the troughs and is secured to the troughs at its ends by any suitable means as, for example, by welding. One of the troughs, here shown as 134, is provided with an opening 142 in its sloping wall to provide the desired communication with the conduit 140. The other trough has no such opening and therefore does not communicate with the conduit 140, but instead is provided with a connection 143 out through the column wall. Several nozzles 144 are shown secured to branch conduits 146 and communicate with conduit 140 through them.

As is best seen in Figs. 7 and 9, the nozzles 144 open downward and thus discharge into the lower section, which is the high-pressure section, of the column. The nozzles discharge onto a fine mesh screen 148 which is secured to the inside of a shell 150 near its upper end. The shell 150 is provided with a lower end cap 152 and forms the lower section of the column. Shell 150 is secured to the evaporator-condenser section 6 by means of a flange 154 secured to shell 150 and a flange 156 secured to shell 78. The two flanges 154 and 156 may be secured together by any suitable means, as for example by bolts 158.

A mounting sleeve 160 is secured inside the shell 150 near the lower end thereof by means of bolts 162 engaging nuts 164 secured to the outside of shell 150. A conical screen 166 is mounted inside the lower end of the lower section of the column by being secured to sleeve 160.

As will be understood by those skilled in the art, the cavity 168 inside the shell 150 and between the two screens 148 and 166 is desirably packed with stainless steel saddles of the type referred to above.

The lower end of the lower section is preferably provided with a mounting flange 170. An air inlet connection 172 is provided in an opening 174 in shell 150. An outlet connection 176 is provided in the end cap 152 to permit the withdrawal of liquid from the lower column section 4.

*Operation*

In describing the operation of a double column of the type referred to herein, and incorporating the embodiment of the invention illustrated and described, it will be assumed that equilibrium conditions have been reached. It will further be assumed that the double column shown and described is used in a system of the general type disclosed and claimed in the above-identified application to Samuel C. Collins.

Air enters the lower section of the column by way of the connection 172 where it undergoes a partial rectification, in the course of which the lower boiling point vapors, chiefly nitrogen, rise up through the screen 166, the packed cavity 168, screen 148 and into the interior of the chamber 86. In the chamber 86, the vapors come into contact with the exteriors of the conduits 102, 106 and 110 and are condensed. The condensed droplets of liquid flow along the sloping or inclined portions of the conduits 102, 106, and 110 into the troughs 134 and 136. The condensate from trough 134 is discharged into the lower section of the column through the liquid distributor 138 and flows downward through the packed cavity 168 as reflux liquid.

The oxygen-rich liquid air from the bottom of the lower section is withdrawn therefrom through the connection 176 and, after suitable heat exchange with other fluids as will be understood by reference to the above-identified Collins application, discharges into the upper section of the column through the liquid distributor 40. Here the liquid flows through the opening 48 into the ring 42, thence through the right-angle conduits 44 into the short conduits 46. Some of the liquid overflows up over the tops of the conduits 46 onto the screen 52, but most of it discharges downward through the screen 50 and into the packed cavity 75 where it comes into intimate contact with vapors flowing upward in the column. These vapors come from the action of evaporator-condenser 6. The liquid falling downward through the column into the evaporator-condenser section 6 collects in the spaces 118 and 120 and flows through the conduits 102, 106 and 110. The more volatile constituents of the liquid are thus evaporated by giving up heat to the vapors in contact with the exteriors of the aforesaid conduits. The vapors thus distilled from the liquid in the spaces 118 and 120 are some of the vapors that rise through the upper section of the column.

It will be recalled that liquid, mostly nitrogen, collects in both troughs 134 and 136. The disposition of the liquid in trough 134 has been accounted for above. The liquid collecting in the trough 136 is withdrawn through the connection 143 and, after suitable heat exchange with other fluids in the system as will be understood after referring to the above-identified Collins application, is introduced into the upper section of the column by way of the connection 26. From connection 26 the liquid flows through the liquid distributor 30 downward through the entire upper section of the column where it comes into intimate contact with upward-flowing vapors; the vapors then pass through the openings 20 in the upper end wall 18 and leave the column by way of the connection 28.

For certain operating conditions, as will be best understood by reference to the above-identified Collins application, air from the expansion engine is introduced into the upper section of the column by way of the connection 66. This by-pass air, so called, passes into the pie-shaped space defined by screen 61 and into the packing between the screens 50 and 52. Liquid in the by-pass air flows downward in the column and the vapors of said by-pass air flow upward in the column.

The oxygen product is withdrawn from the column in the liquid form through the connections 124 and 126 and passes to the chamber device 122, whence it goes to a suitable pump or, if desired, may be withdrawn from the system directly as liquid through the connection 132.

It will be evident to those skilled in the art that this invention discloses an improved double-column for the rectification of gases such as air, which has the advantage of providing a great deal of surface area in a compact space. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In a rectification column, an open-ended walled chamber having openings in the walls thereof, means to provide a fluid-tight seal between the column and the chamber at the open end of the chamber, a plurality of conduits open at both ends to the chamber exterior and having their ends secured in said openings, a pair of spaced-apart condensate collector troughs beneath the conduits, and a liquid distributor mounted adjacent the troughs and having a connection to receive liquid from one of them.

2. A column according to claim 1, in which the distributor includes a conduit spanning the space between the troughs and secured to them, one of the troughs having an opening therethrough communicating with the interior of said distributor conduit to provide said connection.

3. In a column according to claim 1, a liquid outlet connected to withdraw liquid from that one of the troughs which does not discharge liquid into the liquid distributor.

4. A column according to claim 1, in which some of the plurality of conduits are arranged with their ends substantially parallel and other of said conduits are arranged with their opposite ends substantially at right angles.

5. A column according to claim 1, in which the conduits are placed in the compartment with the portions of the conduits between the ends occupying a position at a substantial slope.

6. A column as set forth in claim 1, in which some of said plurality of conduits are arranged with their ends parallel and the portions between the ends having a slope in one direction, there being still other of the conduits arranged in the chamber with their ends parallel and the portions between the ends sloping in a direction to cross the first-named sloping portions, and there being still other of the plurality of conduits arranged with their ends substantially at right angles.

7. In a rectification column having rectifier sections operable at different pressures, an open-ended walled chamber having openings in the walls thereof, means to provide a fluid-tight seal between the column and the chamber at its open end, said seal and the chamber dividing the column into the aforesaid sections, a plurality of conduits open at both ends to the chamber exterior and having their ends secured in the openings of the chamber walls, a pair of condensate collectors mounted beneath the conduits, a liquid distributor mounted adjacent the collectors and having a connection to receive liquid from one of them, said distributor having outlets adapted to discharge liquid into one of the aforesaid sections, a liquid outlet from the column connected to withdraw liquid from the other one of said collectors, and a liquid inlet for the other one of said sections to receive liquid from said outlet.

8. A column according to claim 7, in which the collectors comprise a pair of spaced-apart troughs, the distributor including a conduit mounted between the troughs and secured to them, one of said troughs having an opening therethrough into the distributor-conduit to provide said liquid connection.

9. In a rectification column, an open-ended walled chamber having openings in the walls thereof, means to provide a fluid-tight seal between the column and the chamber at its open end, and a plurality of conduits disposed in the chamber with the conduit ends spaced apart in the openings and with the portions between the ends of adjacent conduits lying in contact.

10. In a column according to claim 9, a pair of condensate collectors beneath the conduits, and a liquid distributor mounted adjacent the collectors and connected to receive liquid from one of the collectors.

11. In a rectification column, an open-ended walled chamber having openings in the walls thereof, means to provide a fluid-tight seal between the column and the chamber at the open end of the chamber, a plurality of conduits open at both ends and having their ends secured in said openings such that the open ends of the conduits are disposed parallel to each other, and another plurality of conduits open at both ends and having their ends secured in said openings such that the open ends of the conduits are substantially at right angles to each other, the conduits being placed in the chamber with the portions between the ends occupying a position at a substantial slope but less than vertical.

12. In a vertically disposed rectification column having a lower column section and an upper column section, an evaporator-condenser comprising: an open-ended chamber having openings in the walls thereof, means providing a fluid-tight seal between the column and the chamber at its open end to divide the column into said lower and upper sections, a plurality of conduits mounted in said wall openings with their ends opening in a horizontal direction, other conduits mounted in said wall openings, each with one end opening in a horizontal direction and its other end opening in a vertical direction, a pair of condensate collectors mounted in the column below the conduits, a distributor connected to receive liquid from a collector and to discharge the liquid into the lower column section, an outlet for liquid collected in the other collector, and a liquid inlet to the upper column section for liquid from said other collector.

WIN W. PAGET.

REFERENCES CITED

The following references are of record in the file of this patent:

UNITED STATES PATENTS

| Number | Name | Date |
|---|---|---|
| 676,485 | Altman | June 18, 1901 |
| 2,160,898 | Peff | June 6, 1939 |
| 2,217,467 | Bonnaud | Oct. 8, 1940 |